(12) United States Patent
Moris et al.

(10) Patent No.: US 11,293,570 B2
(45) Date of Patent: Apr. 5, 2022

(54) VARIABLE-GEOMETRY SEALED COUPLING

(71) Applicant: MDC, Frontenex (FR)

(72) Inventors: Damien Moris, Albertville (FR); Christophe Moris, Mercury (FR)

(73) Assignee: MDC, Frontenex (FR)

( * ) Notice: Subject to any disclaimer, the term of this patent is extended or adjusted under 35 U.S.C. 154(b) by 223 days.

(21) Appl. No.: 16/564,491

(22) Filed: Sep. 9, 2019

(65) Prior Publication Data

US 2020/0200309 A1 Jun. 25, 2020

(30) Foreign Application Priority Data

Dec. 20, 2018 (FR) ...................................... 1873502

(51) Int. Cl.
*F16L 27/08* (2006.01)

(52) U.S. Cl.
CPC ................................ *F16L 27/0849* (2013.01)

(58) Field of Classification Search
CPC ..... F16L 27/08; F16L 27/0849; F16L 27/023; F16L 27/0804; F16L 27/0837; F16L 27/0841; F16L 27/0845; F16L 43/00; F16L 25/14
USPC .......... 285/272, 184, 278, 280, 281, 148.27, 285/146.1
See application file for complete search history.

(56) References Cited

U.S. PATENT DOCUMENTS

| 4,791,961 A | * | 12/1988 | Nitzberg | .............. | B67D 7/3218 |
| | | | | | 137/614.04 |
| 2014/0007411 A1 | | 1/2014 | Prizant | | |

FOREIGN PATENT DOCUMENTS

| CN | 2185366 Y | 12/1994 |
| FR | 2411351 A1 | 7/1979 |
| FR | 2 783 301 A1 | 3/2000 |
| FR | 3011307 A1 | 4/2015 |

OTHER PUBLICATIONS

Search Report issued in French Patent Application No. 1873502 dated Aug. 6, 2019 with English translation provided.

* cited by examiner

*Primary Examiner* — Aaron M Dunwoody
(74) *Attorney, Agent, or Firm* — Nixon & Vanderhye (57) ABSTRACT

Disclosed is a variable-geometry sealed coupling of the type of that connecting together two elements each arranged with a passage hole, the sealed coupling including two hollow bodies preformed to form a pivot connection, with the axis of this pivot connection making it possible to switch the axes of the passage holes from a straight position to a bent position, remarkable in that at least one of the bodies is preformed in such a way that the axis of the passage hole of the element with which it cooperates is offset with respect to the axis of the pivot connection, and is therefore not secant nor is it confounded with the axis of the pivot connection that it forms with the other body in such a way that the rotation of the bodies together is facilitated due to the out-of-roundness of the axes.

19 Claims, 14 Drawing Sheets

VARIABLE-GEOMETRY SEALED COUPLING

FIELD OF APPLICATION OF THE INVENTION

The present invention relates to the field of variable-geometry sealed couplings and in particular to the adaptations that make it possible to vary their geometry in the best conditions.

DESCRIPTION OF PRIOR ART

There is in prior art a variable-geometry sealed coupling of the type of that connecting together two elements each arranged with a passage hole, the sealed coupling comprising two hollow bodies preformed to pivot relative to each other, with each body each comprising two ends, a first end and a second end, the two first ends being preformed to cooperate together and form a pivot connection, the two second free ends each cooperating with the passage hole of one of the two elements to be connected, the axis of this pivot connection being oriented in such a way that, for the most common embodiment, it makes it possible to switch the axes defined by the passage holes of the elements from a substantially coaxial so-called straight position to an angularly different so-called bent position.

The word "preformed" designates a plurality of considered embodiments, among the following:
 machining,
 molding,
 forging,
 cold heading,
 three-dimensional printing,
 etc.

An example is described in document FR2783301.

This result was obtained by the fact that the hollow bodies pivoting with respect to one another had two ends:
 a first free end for cooperating axially with the passage hole of an element to be connected,
 a second end preformed to form a pivot connection with the other body according to an axis arranged at substantially forty-five degrees with respect to the axes of the first ends (for a bent position at ninety degrees). Thus, a rotation of one hundred and eighty degrees along their pivot connection of a body with respect to the other allowed for an orientation at ninety degrees from their free end.

An angular orientation different from forty-five degrees of the axis of the pivot connection is possible, with the positions of departure and of arrival after a rotation of one hundred and eighty degrees then being different.

This coupling can be used for the purposes of creating a protected passage for a plurality of situations, among the following:
 the flow of powdery materials,
 the flow of fluids,
 the passing of cables,
 the passage of optical fiber(s),
 etc.

This coupling has for advantage to offer greater possibilities for the sealed connection of the elements wherein passage holes or tubular elements are defined such as
 two pipes,
 a pipe and a piece of equipment (distribution gun, tool operating using fluid),
 a solid tube,
 a rigid tube,
 a flexible tube,
 a tube with modular segments,
 quick coupler,
 etc.

When the element is tubular, the open end of the tube constitutes said passage hole.

Indeed, in addition to the junction of elements aligned or arranged at a right angle, such a coupling authorizes the sealed junction between two elements of which the passage holes that cooperate with the coupling are not coaxial or which are not perpendicular.

This function however implies that the coupling is subjected to mechanical forces at its two ends, at the location where it is physically connected. Thus, in certain angular positions of the coupling, in particular in the so-called straight position and in the so-called bent position at the end of the elements to be connected, a "hard" spot appears, which tends to freeze the position to the detriment of the facility of movement around the pivot axis. This thus results in discomfort for the user and a feeling of abnormal "blocking" despite the fact that no obstacle in the coupling itself is opposing the pivoting between the two bodies that form it.

DESCRIPTION OF THE INVENTION

Taking the view in this regard, the applicant conducted research aimed at providing a solution to the disadvantages of the variable-geometry sealed couplings of prior art.

This research resulted in the designing and the carrying out of an improved coupling which makes it possible to transform the forces and the stresses subjected, into mechanical forces or moments that make it possible to suppress the structural balancing points at the origin of the blockings present in the coupling in the straight and bent position.

The improved variable-geometry sealed coupling is of the type of that connecting together two elements each arranged with a passage hole, the sealed coupling comprising two hollow bodies preformed to pivot relative to each other, with each body each comprising two ends, a first end and a second end, the two first ends being preformed to cooperate together and form a pivot connection, the two second free ends each cooperating with the passage hole of one of the two elements to be connected, with the axis of this pivot connection making it possible to switch the axes of the passage holes from a straight position to a bent position.

According to the invention, the sealed coupling is remarkable in that at least one of the bodies is preformed in such a way that the axis of the passage hole of the element with which it cooperates is offset with respect to the axis of the pivot connection, and is therefore not secant nor is it confounded with the axis of the pivot connection that it forms with the other body in such a way that the rotation of the bodies together is facilitated due to the out-of-roundness of the axes.

This out-of-roundness thus resolves the disadvantages of the couplings of prior art by creating a lever arm in relation to the rotation axis of the pivot connection. The "hard" spot observed until here will no longer be present since the lever arm created gives the possibility of a mechanical moment to the force applied to the coupling when the use thereof requires the pivoting thereof. This technical effect created by this new arrangement of the axes, can be quantified and is effective, according to the dimensions of the coupling, starting with a few hundredths of millimeters of offset by complying with the compactness parameters required for this type of equipment.

Indeed, the applicant was able to observe that the coaxiality and the concurrency of the axes at the same point in the straight position and the concurrency in the same point in the bent position which are configurations sought for the flow of fluids were also the cause of the creation of said "hard" spots. By accepting to offset the axes, by making them non-coplanar, the applicant proposes a non-conventional configuration, more difficult to manufacture but which resolves the problems of prior art.

The axis of the free ends of at least one of the pivoting bodies is therefore offset in relation to the axis of said pivot connection in such a way that the axis of the passage hole arranged in the element to be connected and therefore the element to be connected itself is offset in relation to the axis of said pivot connection.

According to another particularly advantageous characteristic of the invention, the axis of this pivot connection makes it possible to switch the axes of the passage holes of said elements from a substantially coaxial position to a substantially perpendicular position.

According to another particularly advantageous characteristic of the invention, the two bodies are preformed in such a way that the axis of the passage holes of the element with which each one cooperates is not secant nor is it confounded with the axis of the pivot connection that they form together in such a way that the rotation of the bodies together is facilitated due to the out-of-roundness of the axes.

Several non-limiting configurations are possible for creating said offset, among the following:
- the offset is a linear deviation,
- the offset is a linear and angular deviation,
- the offset is created by the linear offset of a bore and of an internal thread arranged in the free end of at least one body,
- the offset is created by the linear offset and the inclination of a bore and of an internal thread arranged in the free end of at least one body,
- the offset is created by the receiving in a second end along a linearly offset and/or angularly inclined axis of a rotating joint with which cooperates the passage hole arranged in an element,
- the offset is created by the carrying out of an external thread along a linearly offset and/or angularly inclined axis,
- offset machining,
- eccentric machining of the first ends cooperating together in such a way that the pivot connection that they form is eccentric,
- form of connection,
- etc.

Another characteristic relates to the maintaining in position of the angular position reached by the two bodies. Thus, according to another particularly advantageous characteristic of the invention, a clamping ring guided in rotation at a first end of a first body by screwing cooperates with a thread preformed on the first end of the second body, which makes it possible to block the two bodies in position once the correct angular position is reached.

Another characteristic relates to the tightness of the pivot connection. Indeed, the latter is subjected to different stresses due to the offset or offsets proposed by the new configuration of the coupling. These stresses can in certain cases, make it impossible to use a conventional O-ring seal.

Thus, according to another particularly advantageous characteristic of the invention, said pivot connection is made tight by a circular seal with at least two lips. There is thus therefore always one lip that remains in contact. According to a preferred embodiment, said seal is of the type with two lips and adopts a V-shaped section. According to another preferred embodiment, said seal is of the type with four lips and adopts an X-shaped section.

With the fundamental concepts of the invention having been exposed hereinabove in their most elementary form, other details and characteristics shall appear more clearly when reading the following description and with regards to the accompanying drawings, giving by way of a non-limiting example, several embodiments of a coupling in accordance with the invention.

DESCRIPTION OF PREFERRED EMBODIMENTS

As shown in the drawings of FIGS. 1, 2, 3 and 4, the variable-geometry sealed coupling referenced as R1 as a whole is of the type of that which connects two tubular elements together (not shown).

This sealed coupling R1 comprises two hollow bodies 100 and 200 preformed to pivot relative to each other. Each body 100 and 200 each comprises two ends, a first end 110 and 210 and a second end 120 and 220.

The two first ends 110 and 210 are preformed to cooperate together in such a way that their respective hollow cores (not shown) communicate and in order to form a pivot connection.

The two second free ends 120 and 220 each receive the end of one of the two tubular elements (not shown) to be connected.

Figure 1:
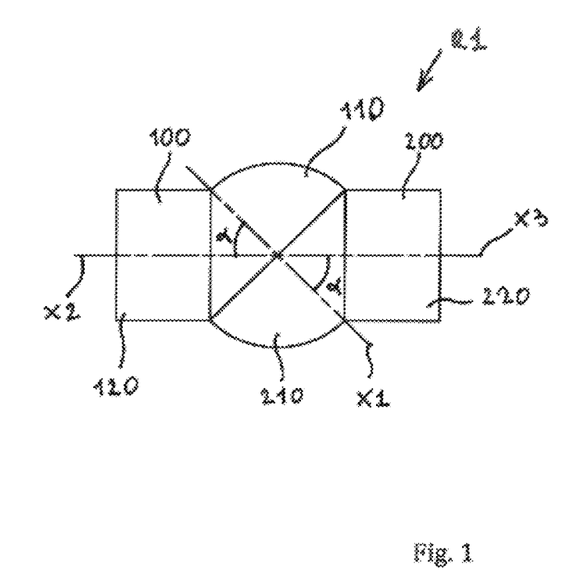
FIG. 1 is a schematic drawing of an outside front view of an embodiment of a coupling in accordance with the invention in the straight position.
Figure 2:
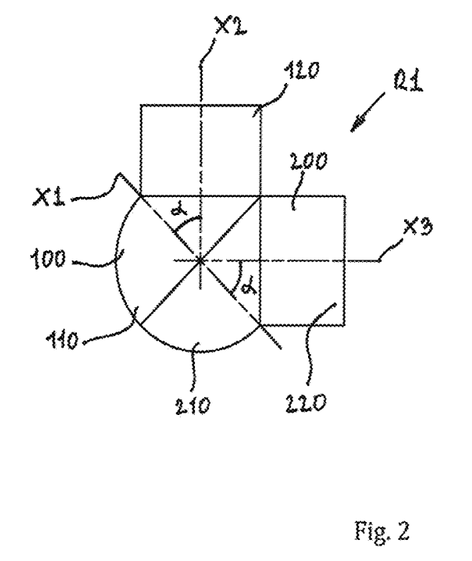
FIG. 2 is a schematic drawing of an outside front view of the coupling of the FIG. 1 in the bent position to the extreme.

In the projection plane of the FIG. 1, the two bodies 100 and 200 are preformed in such a way that the axis X1 of the pivot connection that they form is positioned along an angle α of substantially 45 degrees which makes it possible to switch the axes of the tubular elements (not shown) from a substantially coaxial position shown by the drawing of FIG. 1 to a substantially perpendicular position shown by the drawing of FIG. 2.

According to the invention, at least one of the bodies 100 or 200 is preformed in such a way that the axis of the tubular element that it receives is offset with respect to the axis of the pivot connection, is therefore not secant nor is it confounded with the axis of the pivot connection that it forms with the other body in such a way that the rotation of the bodies together is facilitated due to the out-of-roundness of the axes.

The coupling R1 is preformed in such a way that the two bodies 100 and 200 are preformed to create this offset.

Figure 3:
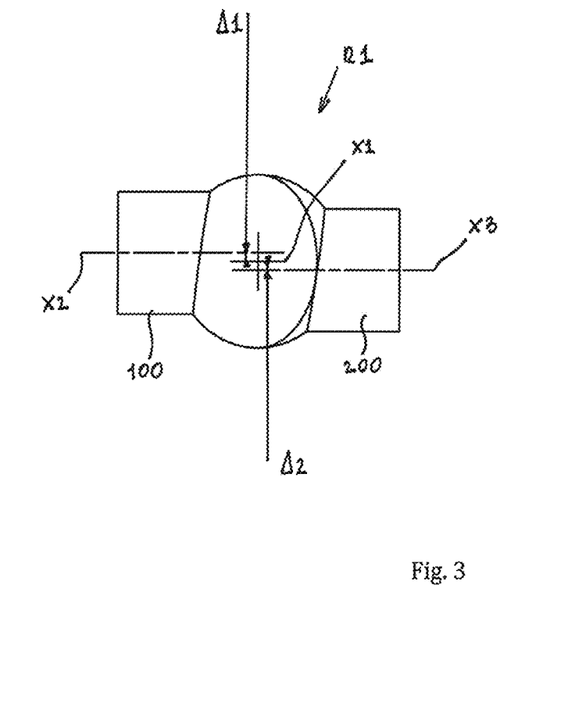
FIG. 3 is a schematic drawing of an outside top view of the coupling of the FIG. 1 in the position of FIG. 1.
Figure 4:
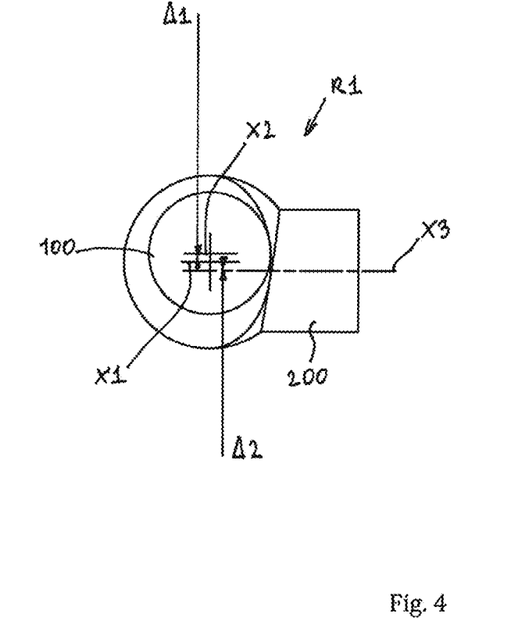
FIG. 4 is a schematic drawing of an outside top view of the coupling of the FIG. 1 in the position of FIG. 2.

In the projection plane of the FIGS. 3 and 4, it is understood that the axes X2 and X3 of the free ends respectively 120 and 220 of the hollow bodies 100 and 200 are offset in space in relation to plan wherein is located the pivot axis X1 that connects them. As front views (FIGS. 1 and 2), X2 and X3 are coplanar although as a top view they are arranged in different vertical planes on each side of the plane wherein the axis X1 is located. This offset avoids the presence of "hard" spots in the right and bent position by creating lever arms Δ1 and Δ2 in relation to the axis of rotation X1 of the pivot connection between the two bodies 100 and 200.

Figure 5:
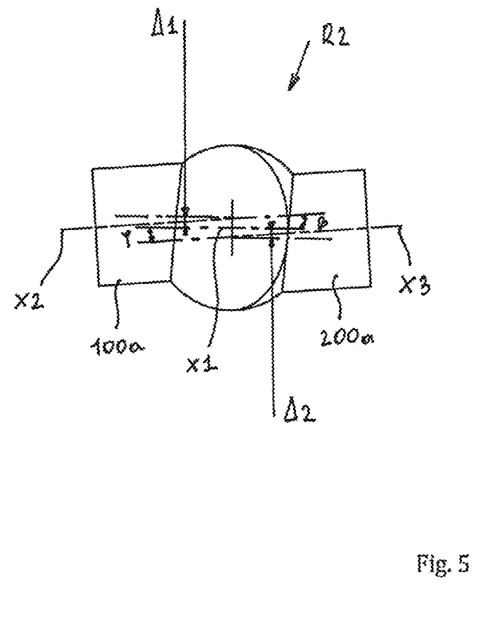
FIG. 5 is a schematic drawing of an outside top view of a second embodiment of a coupling in accordance with the invention in the straight position.

Although for R1, the offset is linear i.e. the axes are horizontally offset in the projection plane of FIGS. 3 and 4, the embodiment shown by the drawing of FIG. 5 shows a coupling R2 where the offset can also be angular. Thus, the offset is constructed here by the fact that the axes X2 and X3 of the second ends of the bodies 100a and 200a are not only offset linearly along Δ1 and Δ2 with respect to the plane of X1 but also angularly along the angles β and γ.

Figure 6:
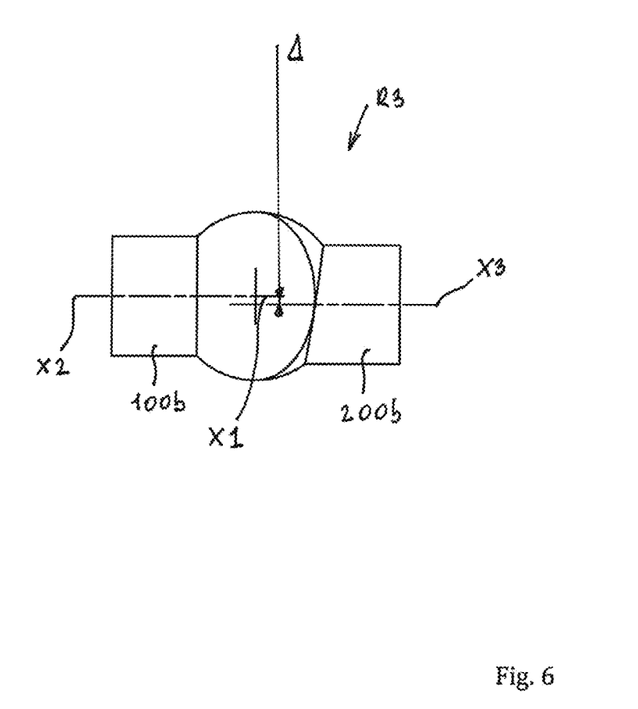
FIG. 6 is a schematic drawing of an outside top view of a third embodiment of a coupling in accordance with the invention in the straight position.

The coupling R3 shown by the drawing of FIG. 6 respects another embodiment with bodies 100b and 200b, wherein only the free end of the hollow body 200b is preformed in such a way as to create a linear offset Δ. The axes X2 and X1 are then coplanar when viewed from the front as well as when viewed from above.

Figure 7:
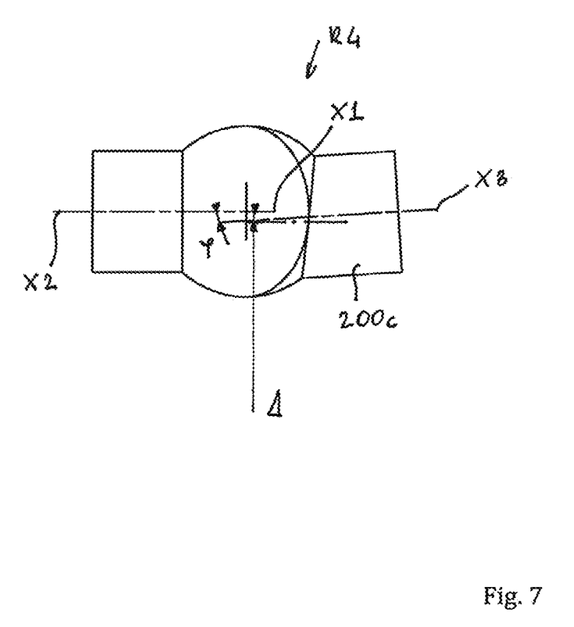
FIG. 7 is a schematic drawing of an outside top view of a fourth embodiment of a coupling in accordance with the invention in the straight position.

The coupling R4 shown by the drawing of FIG. 7 respects another embodiment wherein only the free end of the hollow body 200c is preformed in such a way as to create an angular γ and linear Δ offset between the axes X3 and X1. The axes X2 and X1 are as for the preceding embodiment, coplanar when viewed from the front as well as when viewed from above.

The couplings shown in the following figures are shown in a more precise manner but use the principles of the embodiments described hereinabove. In addition, although the preferred but not limited embodiments shown are machined, a plurality of preformation modes is possible.

Figure 8:
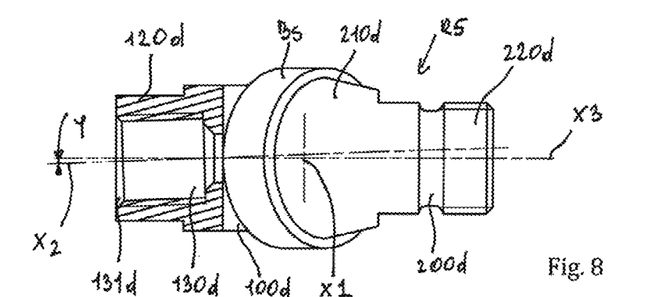
FIG. 8 is a schematic drawing of a partial cross-section view of the top of a fifth embodiment of a coupling in accordance with the invention in the straight position.
Figure 9:
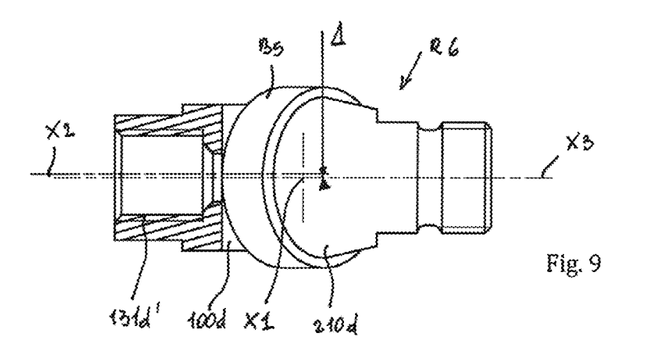
FIG. 9 is a schematic drawing of a partial cross-section view of the top of a sixth embodiment of a coupling in accordance with the invention in the straight position.
Figure 10:
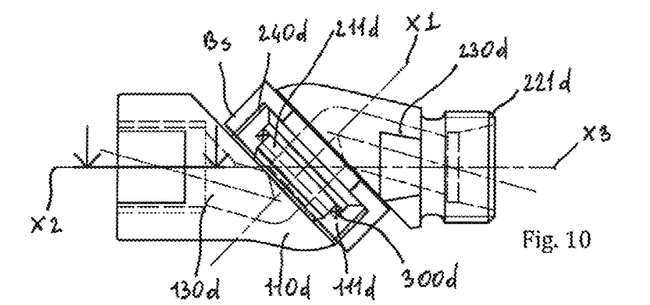
FIG. 10 is a schematic drawing of an outside front view of the couplings of the FIGS. 8 and 9.

The couplings R5 and R6 shown by the drawings of FIGS. 8 and 10 for R5 and 9 and 10 for R6, include two hollow bodies 100d and 200d preformed to pivot relative to each other. FIG. 10 constitutes a front view that corresponds both to R5 and R6, due to the absence of a difference at this scale in the projection as a front view of FIGS. 8 and 9. Each body 100d and 200d each comprises two ends, a first end 110d and 210d and a second end 120d and 220d.

The two first ends 110d and 210d are preformed to cooperate together in such a way that the respective hollow cores 130d and 230d of each body communicate and to form a pivot connection. To do this the two first ends 110d and 210d are preformed with a bore 111d for the end 110d and with a protruding form 211d with a shape adapted for the end 210d. This bore 111d and this cylindrically protruding shape 211d are both oriented along an axis X1 arranged in the projection plane of FIG. 10 to 45 degrees (angle α) of the axes X2 and X3 of the two ends 120d and 220d. This bore and this cylindrical projection cooperate to form a guide bearing which forms the pivot connection. A lip seal 300d provides the seal of the pivot connection.

The two second free ends 120d and 220d each receive the end of one of the two tubular elements (not shown) to be connected. In order to implement this receiving, the second end 120d of the first body 100d is preformed in such a way that the hollow core 130d is threaded interiorly to open onto a threaded portion 131d with which a first tubular element (not shown) can cooperate. In addition, the outer surface of the second end 220d of the second body 200d is preformed to form a threaded sleeve 221d with which a second tubular element (not shown) can cooperate.

In the projection plane of the FIG. 10, the two bodies 100 and 200 are preformed in such a way that the axis X1 of the pivot connection that they form is positioned along an angle α of substantially 45 degrees which makes it possible to switch the axes of the tubular elements (not shown) from a substantially coaxial position shown by the drawing of FIG. 10 to a substantially perpendicular position (not shown but which uses the principle shown by the drawing of FIG. 2).

The offset proposed by the invention is implemented by the way in which the threaded portion 131d is machined that by receiving the first tubular element will orient it angularly and form the axis X2.

Thus, for R5 shown by the drawings of FIGS. 8 and 10 (and corresponding to the embodiment diagrammatically shown by the drawing of FIG. 7), the angular γ and linear Δ offset is implemented by the inclined angular orientation of the bore and of the thread of the portion 131d.

For R6, shown by the drawings of FIGS. 9 and 10 (and corresponding to the embodiment diagrammatically shown by the drawing of FIG. 6), the linear offset Δ is implemented by the linear offset of the axis X2 of the bore and of the thread of the portion 131d'.

Whether for R5 or for R6, no offset is proposed by the second body 200d and X3 is therefore coplanar with X1.

Figure 11:
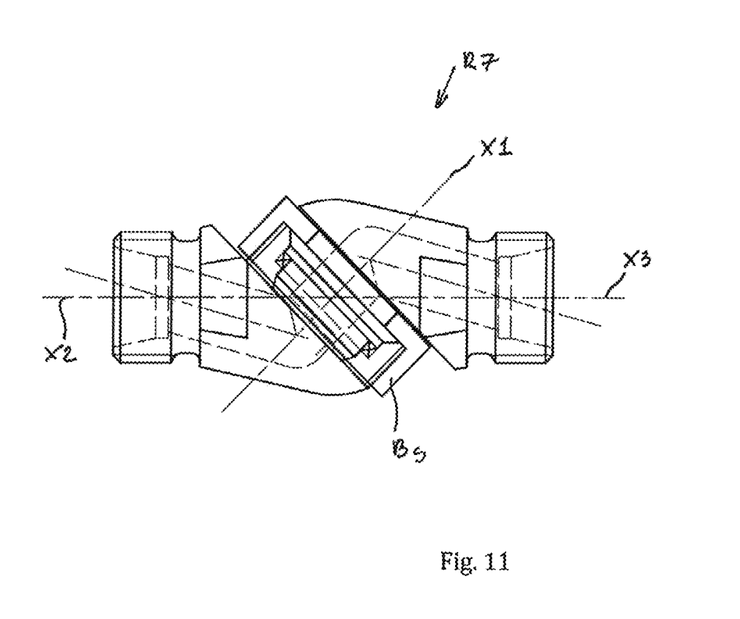
FIG. 11 is a schematic drawing of an outside front view of a seventh embodiment very close to those shown by the drawings of FIGS. 8, 9 and 10.
Figure 12:
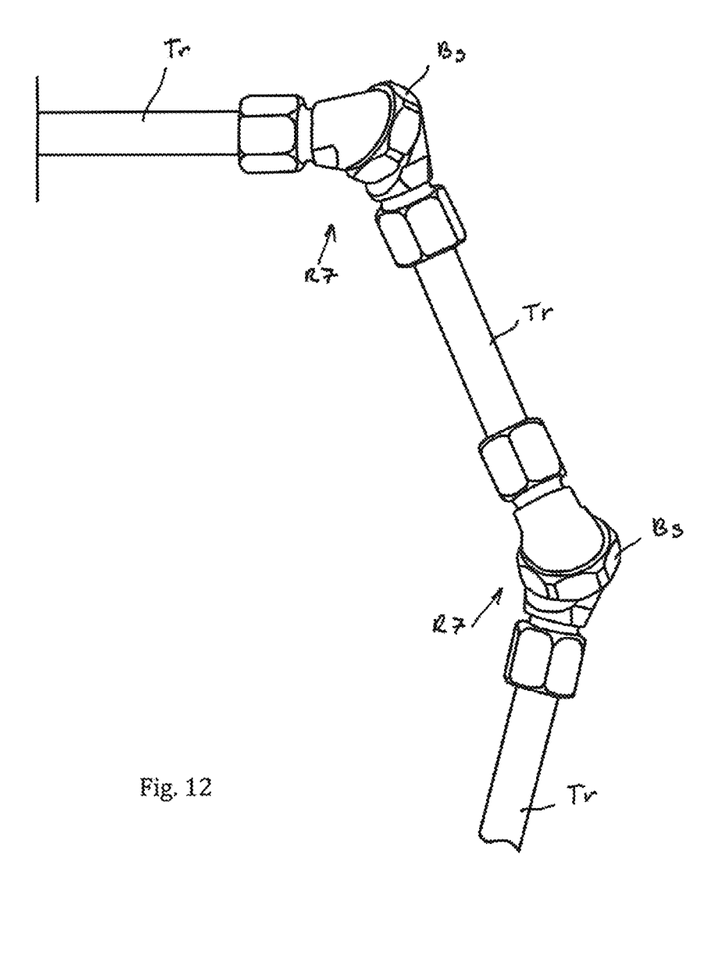
FIG. 12 is a schematic drawing of an outside view of an example of the use of two couplings in accordance with the one that is shown by the drawing of FIG. 11.

Another embodiment R7 is shown on the drawing of FIG. 11, this embodiment uses the characteristics of the embodiments shown by the drawings of FIGS. 8, 9 and 10 with the exception that the offset is created by the carrying out of an external thread (and not internal) along a linearly offset and/or angularly inclined axis. This coupling R7 is used in two copies in the example of use shown by the drawing of FIG. 12 wherein there are rigid tubes Tr and two variable-geometry couplings R7 which make it possible to connect them with different angles.

Figure 18:
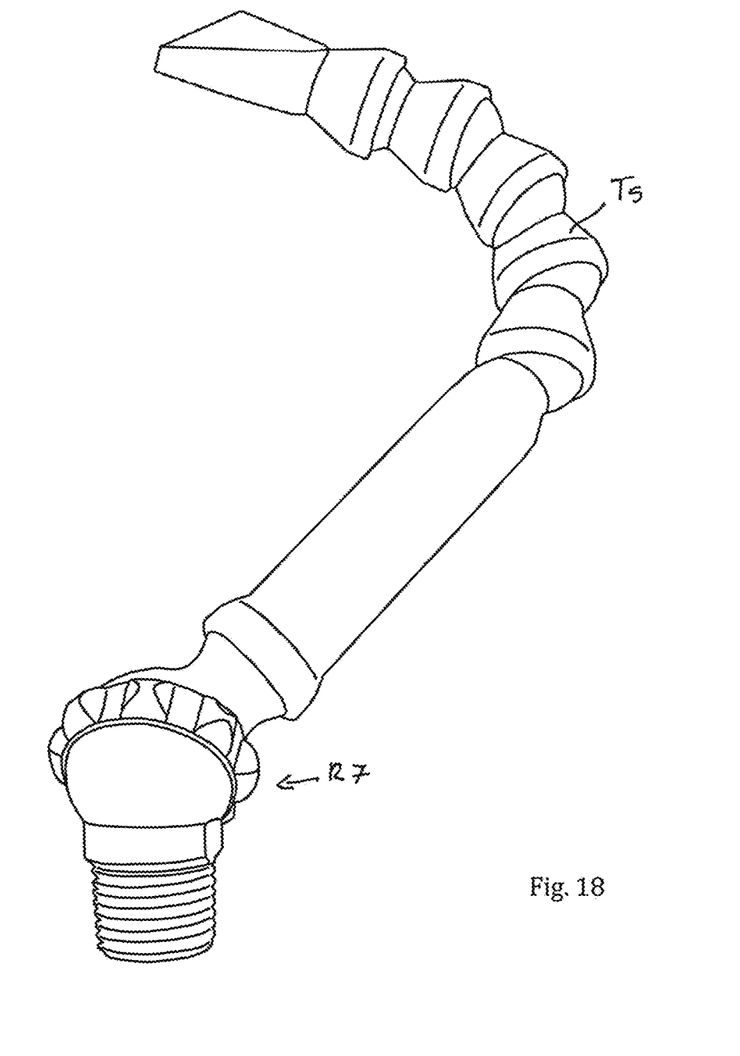
FIG. 18 is a schematic drawing of an example of the use of a coupling in accordance with the one shown by the drawing of FIG. 11.

These embodiments R5, R6, R7 have as another point in common of being provided with a clamping ring Bs which, guided in rotation at a first end 210d of a first body 200d by screwing cooperates with a thread preformed in the first end 110d of a second body 100d, which makes it possible to block the two bodies 100d and 200d in position once the correct angular position is reached. This clamping ring Bs can take the outer shape of a nut such as shown on the drawing of FIG. 12 or of a knurl such as shown on the drawing of FIG. 18 which shows the use of the coupling of the invention R7 to connect a tube with modular segments Ts of the type of those that retain, supply and orient a nozzle.

Figure 13:
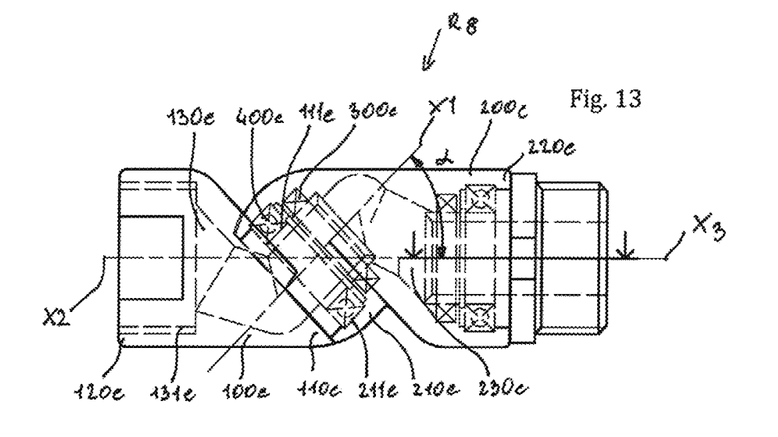
FIG. 13 is a schematic drawing of an outside front view of an eighth embodiment of a coupling in accordance with the invention in the straight position.
Figure 14:
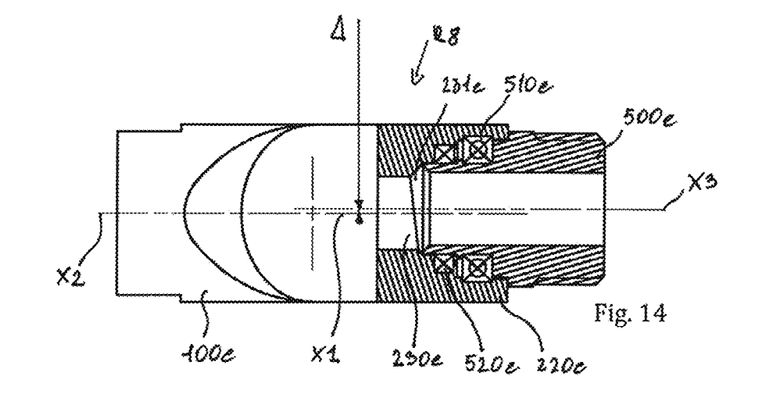
FIG. 14 is a schematic drawing of a partial cross-section view of the top of the coupling of the FIG. 13.
Figure 15:
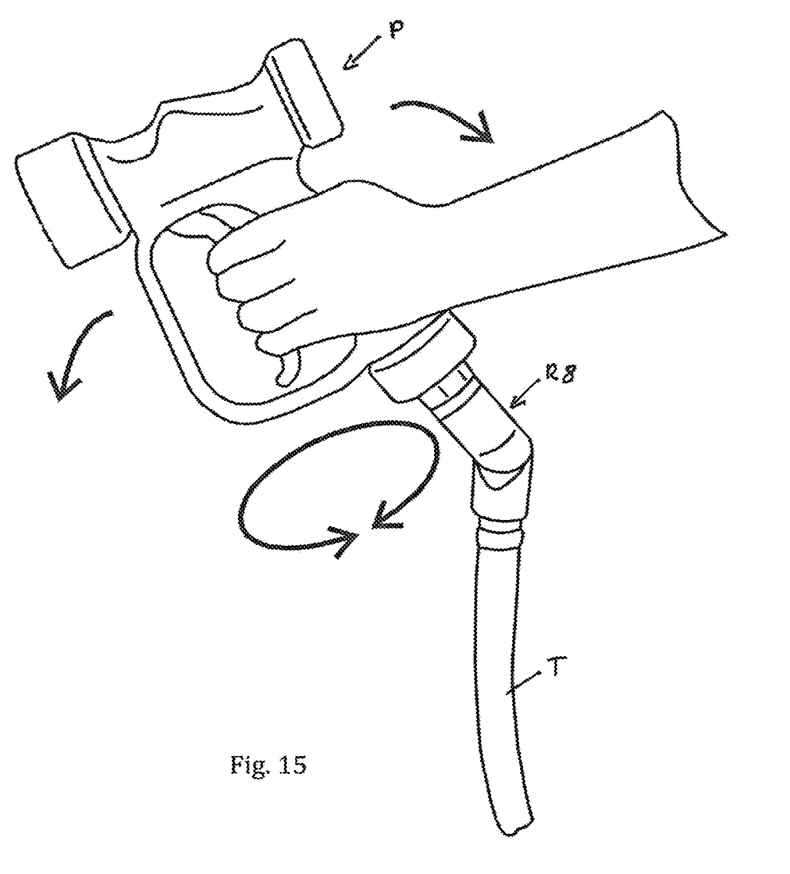
FIG. 15 is a schematic drawing of an outside view of an example of the use of a coupling in accordance with the one shown by the drawing of FIG. 13.

Another embodiment of a coupling R8 is shown by the drawings of FIGS. 13 and 14. This coupling R8 is shown in the situation of dynamic use by the drawing of FIG. 15 where it provides the connection of a manual gun P and of a flexible feed pipe T, the coupling R7 makes it possible to facilitate the movement by limiting the forces due to the hose.

This coupling R8 comprises two hollow bodies 100e and 200e preformed to pivot relative to each other. Each body 100e and 200e each comprises two ends, a first end 110e and 210e and a second end 120e and 220e.

The two first ends 110e and 210e are preformed to cooperate together in such a way that the respective hollow cores 130e and 230e of each body communicate and to form a pivot connection. To do this the two first ends 110e and 210e are preformed with a cylindrical protruding shape 111e for the end 110e and with a bore 211e of a suitable shape for the end 210e. This cylindrical protruding shape 111e and this bore 211e are both oriented along an axis X1 arranged in the projection plane of FIG. 13 at 45 degrees (angle α) of the axes X2 and X3 of the two ends 120e and 220e. This bore and this cylindrical projection cooperate to form a guide bearing that forms the pivot connection. A lip seal 300e provides the tightness of the pivot connection. A bearing 400e or rotating guide element provides the guiding in rotation.

The two second free ends 120e and 220e each receive the end of one of the two tubular elements (cf. FIG. 15) to be connected. In order to implement this receiving, the second end 120e of the first body 100e is preformed in such a way that the hollow core 130e is threaded interiorly to open onto a threaded portion 131e with which a first tubular element can cooperate (cf. FIG. 15). In addition, the second end 220e of the second body 200d is preformed in such a way that the end opening from the hollow core 230e forms a receiving bearing 231e at a rotating joint 500e guided by a bearing 510e and associated with a seal 520e allowing the tightness to be respected. It is this rotating joint 500e that receives the end of the tubular element (cf. FIG. 15) to be connected.

In the projection plane of the FIG. 13, the two bodies 100e and 200e are preformed in such a way that the axis X1 of the pivot connection that they form is positioned along an angle α of substantially 45 degrees which makes it possible to switch the axes of the tubular elements (not shown) from a substantially coaxial position shown by the drawing of FIG. 13 to a substantially perpendicular position (not shown but which uses the principle shown by the drawing of FIG. 2).

As shown in the drawing of FIG. 14, the offset proposed by the invention is implemented by the way in which the receiving bearing 231e is machined which by receiving the rotating joint 500e will position it. This machining is not axial but linearly eccentric according to a deviation Δ. The axis X3 of the bore 231e and of the rotating joint that it receives is therefore off-center with respect to the axis X1.

For R8 which corresponds to the embodiment diagrammatically shown by the drawing of FIG. 6, no offset is proposed by the first body 100e and X2 is therefore coplanar with X1.

Figure 16:
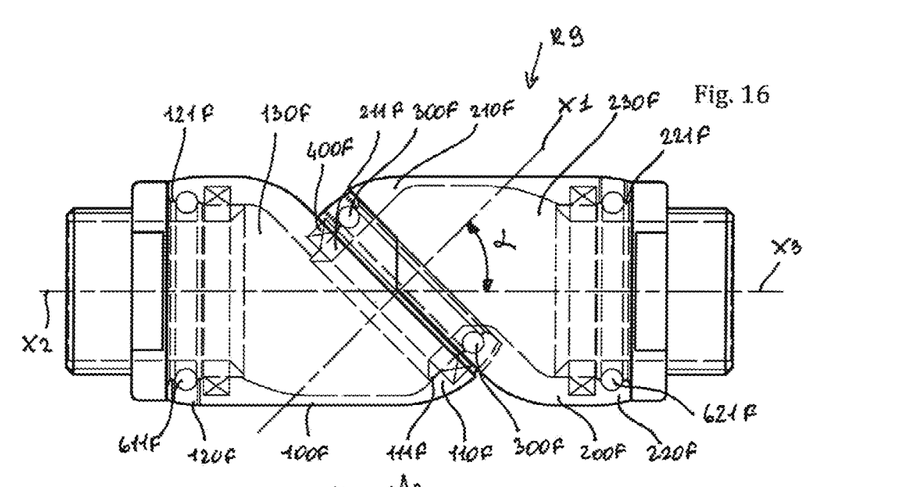
FIG. 16 is a schematic drawing of an outside front view of a ninth embodiment of a coupling in accordance with the invention in the straight position.
Figure 17:
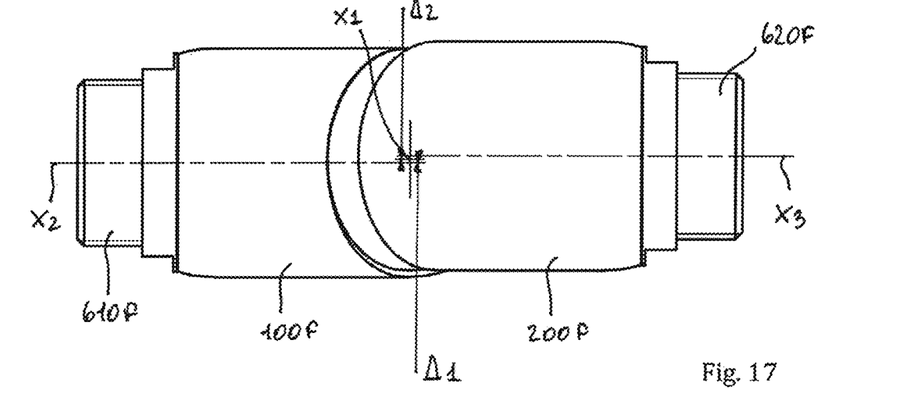
FIG. 17 is a schematic drawing of a partial cross-section view of the top of the coupling of the FIG. 16.

Another embodiment of a coupling R9 is shown on the drawings of FIGS. 16 and 17.

This coupling R9 comprises two hollow bodies 100f and 200f preformed to pivot relative to each other. Each body 100f and 200f each comprises two ends, a first end 110f and 210f and a second end 120f and 220f.

The two first ends 110f and 210f are preformed to cooperate together in such a way that the respective hollow cores 130f and 230f of each body communicate and to form a pivot connection. To do this the two first ends 110f and 210f are preformed with a bore 111f for the end 110f and with a cylindrical protruding shape 211f with a suitable shape for the end 210f. This cylindrical protruding shape 211f and this bore 111f are both oriented along an axis X1 arranged in the projection plane of the FIG. 16 at 45 degrees (angle α) of the axes X2 and X3 of the two ends 120f and 220f. This bore and this cylindrical projection cooperate to form a guide bearing that constitutes the pivot connection. Balls or rotating guide elements 300f provide the guiding in rotation. A lip seal 400f provides the tightness.

The two second free ends 120f and 220f each receive the end of one of the two tubular elements (not shown) to be connected. In order to implement this receiving, the two second ends 120f and 220f are each preformed with a bore 121f and 221f for receiving a hollow cylindrical sleeve 610f and 620f of which a first end is engaged and is guided in rotation into the bore respectively 121f and 221f arranged in the second end and of which the other end is threaded to receive the end of the tubular element to be connected (not shown).

Bearings or rotating guide elements 611f and 621f provide said guiding in rotation between said sleeves 610f and 620f and the bores 111f and 121f wherein they are engaged.

In the projection plane of the FIG. 16, the two bodies 100f and 200f are preformed in such a way that the axis X1 of the pivot connection that they form is positioned along an angle α of substantially 45 degrees which makes it possible to switch the axes of the tubular elements (not shown) from a substantially coaxial position shown by the drawing of FIG. 9 to a substantially perpendicular position (not shown but which uses the principle shown by the drawing of FIG. 2).

As shown in the drawing of FIG. 17, the offset proposed by the invention is implemented by the way in which the bores 111f and/or the sleeve 211f that pivots inside are machined. This machining is not axial but linearly eccentric according to a deviation Δ1 and Δ2 such as shown by the drawing of FIG. 17.

It is understood that the coupling, which has just been described and shown hereinabove, was described and shown for the purpose of a disclosure rather than a limitation. Of course, various arrangements, modifications and improvements can be made to the examples hereinabove, without however leaving the scope of the invention.

The invention claimed is:

1. A variable-geometry sealed coupling (R1) for connecting together two elements each arranged with a passage hole, the sealed coupling comprising:
   first and second hollow bodies (100, 200) preformed to pivot relative to each other,
   each of said first and second hollow bodies (100, 200) comprising a first end (110, 210) and a second end (120, 220),
   the two first ends (110, 210) being preformed to cooperate together and form a pivot connection,
   the two second free ends (120, 220) each configured to cooperate with a respective passage hole of one of the two elements to be connected, and
   the second end (120) of the first hollow body (100) forming an end of a first passage in communication with the first end (110) of the first hollow body (100) and extending along a first axis (X2), and the second end (220) of the second hollow body (200) forming an end of a second passage in communication with the first end (210) of the second hollow body (200) and extending along a second axis (X3),
   wherein the first and second hollow bodies, at the pivot connection formed by the two first ends (110, 210), pivot about an axis (X1) of the pivot connection that forms an angle ($\alpha$) of substantially 45° to both the first and second axes (X2, X3), such that a rotation of the first and second hollow bodies (100, 200) relative to each other about the axis (X1) of the pivot connection changes the first and second axes (X2, X3) of the first and second hollow bodies from a straight position to a bent position, and
   wherein at least one of the first and second hollow bodies is preformed in such a way that the at least one of the first and second axes is offset with respect to the axis (X1) of the pivot connection and is therefore neither secant nor confounded with the axis (X1) of the pivot connection in such a way that the rotation of the first and second hollow bodies (100, 200) is facilitated due to an out-of-roundness of the first and second axes.

2. The coupling (R1) according to claim 1, wherein the axis (X1) of the pivot connection makes it possible to switch the first and second axes (X2, X3) from a substantially coaxial position to a substantially perpendicular position.

3. The coupling (R1) according to claim 1, wherein both the first and second hollow bodies (100, 200) are preformed in such a way that both the first and second axes (X2, X3) are neither secant nor confounded with the axis (X1) of the pivot connection in such a way that the rotation of the first and second hollow bodies (100, 200) is facilitated due to the out-of-roundness of the axes.

4. The coupling (R1) according to claim 1, wherein the offset is a linear deviation.

5. The coupling (R2) according to claim 1, wherein the offset is a linear and angular deviation.

6. The coupling (R6) according to claim 4, wherein the offset is created by a linear offset of a bore and of an internal thread arranged in the free end of the at least one of the first and second hollow bodies.

7. The coupling (R5) according to claim 5, wherein the offset is created by a linear offset and an inclination of a bore and of an internal thread arranged in the free end of the at least one of the first and second hollow bodies.

8. The coupling (R8) according to claim 4, wherein the offset is created by a receiving in a second end along a linearly offset and/or angularly inclined axis of a rotating joint (500e).

9. The coupling (R7) according to claim 4, wherein the offset is created by a carrying out of an external thread along a linearly offset and/or angularly inclined axis.

10. The coupling (R9) according to claim 4, wherein the offset is created by off-center machining of the first ends cooperating together in such a way that the pivot connection is eccentric.

11. The coupling (R8) according to claim 1, wherein said pivot connection is made tight by a circular seal (300e) with at least two lips.

12. The coupling (R7) according to claim 1, further comprising:
   a clamping ring (Bs), guided in rotation at a first end (210d) of the first hollow body by screwing cooperation with a thread preformed on the first end of the second hollow body said clamping ring (Bs) making it possible to block the first and second hollow bodies in an angular position with respect to one another.

13. The coupling (R1) according to claim 2, wherein both the first and second hollow bodies (100, 200) are preformed in such a way that both the first and second axes (X2, X3) are neither secant nor confounded with the axis (X1) of the pivot connection in such a way that the rotation of the first and second hollow bodies (100, 200) is facilitated due to the out-of-roundness of the axes.

14. The coupling (R1) according to claim 2, wherein the offset is a linear deviation.

15. The coupling (R1) according to claim 3, wherein the offset is a linear deviation.

16. The coupling (R2) according to claim 2, wherein the offset is a linear and angular deviation.

17. The coupling (R2) according to claim 3, wherein the offset is a linear and angular deviation.

18. The coupling (R1) according to claim 13, wherein the offset is a linear deviation.

19. The coupling (R2) according to claim 13, wherein the offset is a linear and angular deviation.

* * * * *